United States Patent
Cardillo et al.

(10) Patent No.: US 12,266,249 B2
(45) Date of Patent: Apr. 1, 2025

(54) CONNECTION MANAGEMENT IN A PREMISES MANAGEMENT SYSTEM

(71) Applicant: Comcast Cable Communications, LLC, Philadelphia, PA (US)

(72) Inventors: Jeffrey D. Cardillo, Bridgeton, NJ (US); Benjamin I. Miller, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 32 days.

(21) Appl. No.: 17/938,352

(22) Filed: Oct. 6, 2022

(65) Prior Publication Data

US 2024/0119816 A1    Apr. 11, 2024

(51) Int. Cl.
*G08B 13/196* (2006.01)
*H04L 65/1069* (2022.01)

(52) U.S. Cl.
CPC . *G08B 13/19684* (2013.01); *G08B 13/19682* (2013.01); *H04L 65/1069* (2013.01)

(58) Field of Classification Search
CPC ........ G08B 13/19684; G08B 13/19682; H04L 65/1069
See application file for complete search history.

(56) References Cited

U.S. PATENT DOCUMENTS

| 2014/0215082 | A1* | 7/2014 | Backholm | H04L 65/612 709/227 |
| 2017/0142181 | A1* | 5/2017 | Hu | H04N 21/2187 |
| 2017/0351402 | A1* | 12/2017 | Yoakum | G06Q 10/00 |

* cited by examiner

*Primary Examiner* — Thai Q Tran
*Assistant Examiner* — Jose M Mesa
(74) *Attorney, Agent, or Firm* — BakerHostetler

(57) ABSTRACT

Methods and systems for connection management are disclosed. A first event associated with loading a first page in an application may be determined. The application may be associated with controlling a premises management system located at a premises. A connection may be caused to be established between the application and at least one camera associated with the premises management system based on determining the first event. A command to pause the sending of video frames via the connection may be sent to the at least one camera. A second event associated with loading a second page in the application may be determined. A command to resume the sending of video frames via the connection may be sent to the at least one camera based on determining the second event.

19 Claims, 10 Drawing Sheets

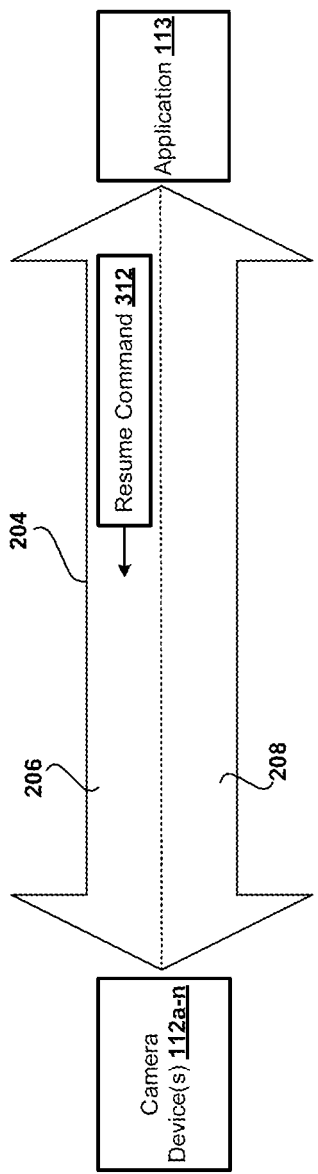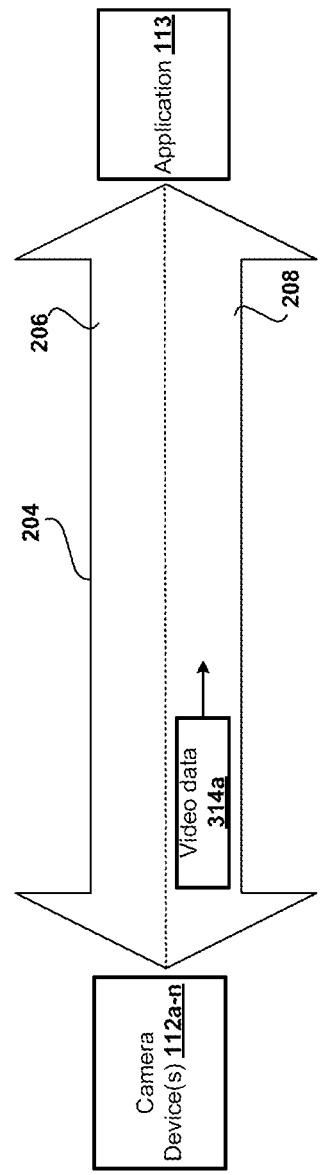

CONNECTION MANAGEMENT IN A PREMISES MANAGEMENT SYSTEM

BACKGROUND

Security cameras are recording devices that capture footage of premises (e.g., users' homes, properties, etc.). Users may view the footage on user devices (e.g., smartphones, tablets, computers, etc.) to monitor the premises. However, if the users attempt to view the footage on user devices, output of the footage may be delayed. Thus, there is a need to reduce the delay associated with output of security camera footage.

SUMMARY

Methods and systems for connection management in a premises management system are disclosed. The premises management system may comprise at least one camera device as well as other devices, such as a gateway, controller, sensor, and/or the like. A user may manage the premises via an application installed on a user device. The application may establish a connection with the at least one camera device according to various events. The connection may be established if the user opens the application (e.g., even if the user has not indicated an interest in video) on the user device, but other events may be used to establish the connection. The connection may be paused (e.g., until the user is interested in viewing the video). Video frames captured by the at least one camera device may not be sent to the application via the connection until the user navigates to a particular page in the application. If the user navigates to the particular page in the application, video frames captured by the at least one camera device may be sent to the application via the connection. The page may be a page that is configured to render video from the at least one camera device, but other pages may be used to trigger the sending of video frames to the premises management application. The premises management application may receive the video frames and output the received video frames so that the user can monitor the premises.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

FIG. 3A shows an example communication process.
FIG. 3B shows an example communication process.

DETAILED DESCRIPTION OF ILLUSTRATIVE EMBODIMENTS

Figure 1:
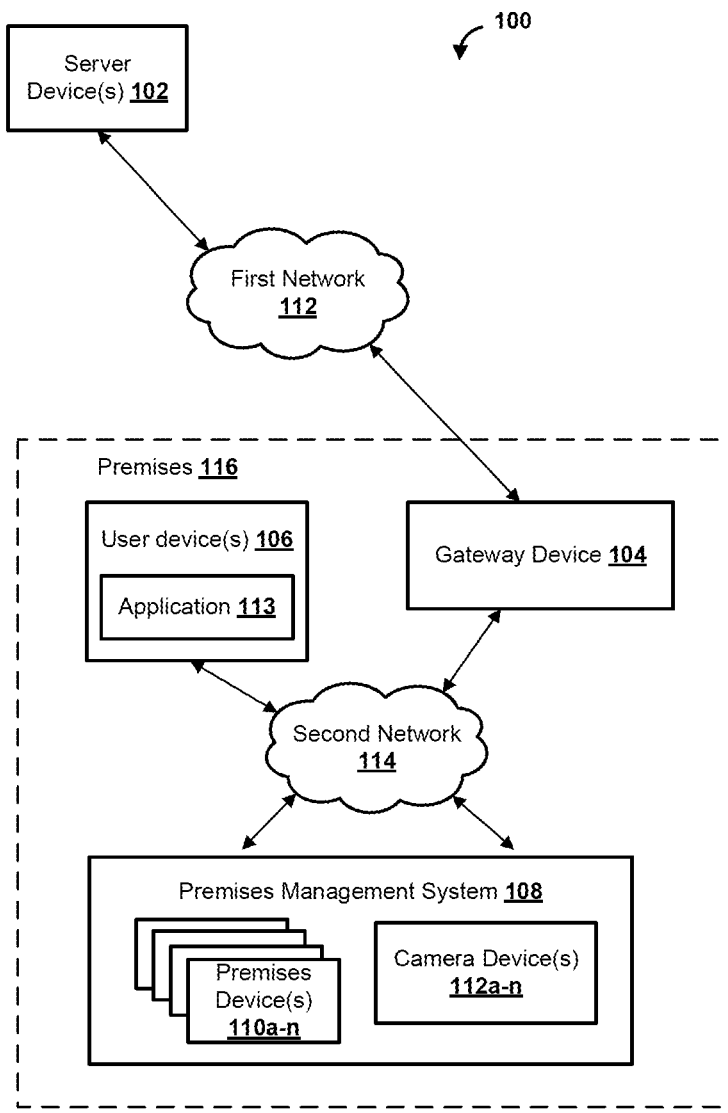
FIG. 1 shows a block diagram of an example system for communication.

Methods and systems for connection management in a premises management system are disclosed. An example premises management system may comprise at least one camera device. The at least one camera device may capture video frames, such as a live video stream and/or video clips. The premises management system may be associated with a premises management application installed on a user device. The premises management system may comprise at least a first page and a second page. The first page may not be configured to display video frames captured by the camera device. For example, the first page may comprise a default page that is loaded if the premises management application is opened on the user device, a page associated with a list of one or more premises devices, or a page associated with status information for the one or more premises devices. The second page may be configured to display video frames captured by the at least one camera device.

A connection may be established between the at least one camera device and the premises management application based on the first page in the premises management application being loaded. The connection may be established without the user requesting a page (e.g., such as based on an event different than the user accessing/requesting the page) comprising video of the at least one camera device. The connection may be established before the user attempts to view a live video stream and/or video clips captured by the at least one camera device via the second page. For example, the connection may be established before the user navigates to the second page. If the connection is established before the user navigates to the second page, a first command may be sent to the at least one camera device. The first command may be a command to pause (e.g., prevent) the sending of video frames to the premises management application via the connection. Pausing the sending of video frames to the premises management application may reduce the amount of data sent and received over the connection.

The second page in the premises management application may be loaded. For example, the user may navigate to the second page, such as from the first page. A second command may be sent to the at least one camera device. The second command may be sent based on determining that the second page has been loaded. The second command may be a command to resume the sending of video frames to the premises management application via the connection. The at least one camera device may resume the sending of video frames to the premises management application based on receiving the second command. The premises management application may receive the video frames from the at least one camera device via the connection. The premises management application may output the received video frames via the second page. As the connection between the premises management application and the at least one camera device was already established prior to the second page being loaded, the received video frames may be output almost immediately (e.g., in less than a second) after the second page is loaded. This sub-second delay may be unnoticeable (e.g., imperceptible) by the user.

FIG. 1 shows a block diagram of an example system 100 for communication. The system 100 may comprise one or more server device(s) 102, a gateway device 104, a user device 106, a premises management system 108, or any combination thereof. It should be noted that while the singular term device is used herein, it is contemplated that some devices may be implemented as a single device or a plurality of devices (e.g., via load balancing). The server device(s) 102, the gateway device 104, and the user device 106 may each be implemented as one or more computing devices. Any device disclosed herein may be implemented using one or more computing nodes, such as virtual machines, executed on a single device and/or multiple devices.

The server device(s) 102, the gateway device 104, the user device 106, and the premises management system 108 may be communicatively coupled via one or more networks, such as a first network 112 (e.g., a wide area network) and one or more second networks 114 (e.g., one or more local area networks). The first network 112 may comprise a content distribution and/or access network. The first network 112 may facilitate communication via one or more communication protocols. The first network 112 may comprise fiber, cable, a combination thereof. The first network 112 may comprise wired links, wireless links, a combination thereof, and/or the like. The first network 112 may comprise routers, switches, nodes, gateways, servers, modems, and/or the like.

The one or more second networks 114 may comprise one or more networks in communication with the gateway device 10, the user device 106, and/or the premises management system 108. The one or more second networks 114 may comprise one or more networks at a premises 116. The premises 116 may be a customer premises. The premises 116 may include an area within a coverage range (e.g., wireless range) of the gateway device 104. The premises 116 may comprise a property, dwelling, terminal, building, floor, and/or the like. The premises 116 may comprise different rooms, walls, door, windows, and/or the like. The user device 106 may move within the premises 116 and/or outside of the premises.

The premises management system 108 may comprise one or more premises devices 110a-n and one or more camera devices 112a-n. The one or more premises devices 110 may be located at the premises 116. The one or more premises devices 110 may comprise one or more of a sensor, a security system, a security controller, a gateway device, a smoke detector, a heat sensor, infrared sensor, infrared emitter, infrared camera, a door sensor, a motion sensor, a window sensor, a thermostat, a microphone, a personal assistant, a door lock, an irrigation device, or a combination thereof. The one or more premises devices 110 may be configured to generate premises data. The premises data may comprise a sensor state, a setting, audio, video, images, text information, premises mode, or a combination thereof. The premises data may comprise thermal data, such as heat sensor data, data of an infrared sensor (e.g., data for each of a plurality of pixels of the sensor), a thermal signature, a combination thereof, and/or the like. The one or more premises devices 110 may be configured to send the premises data to one or more of the server device(s) 102, the user device 106, the gateway device 104, or a combination thereof.

The one or more camera devices 112a-n may be located at the premises 116. The one or more camera devices 112 may be configured to generate camera data. The camera data may include video data, audio data, and/or image data. The video data may include one or more video frames captured by the camera devices 112. For example, the video data may include a live video stream and/or video clips captured by the camera devices 112. The audio data may include a live audio stream and/or audio clips captured by the camera devices 112, such as a live audio stream and/or audio clips captured by one or more microphone(s) of the camera devices 112. The image data may include one or more images captured by the camera devices 112. The one or more camera devices 112 may continuously capture camera data and store it, such as in a buffer. The one or more camera devices 112 may be configured to send the camera data to one or more of the server device(s) 102, the user device 106, the gateway device 104, or a combination thereof.

The user device 106 may comprise a computing device, a smart device (e.g., smart glasses, smart watch, smart phone), a mobile device, a tablet, a computing station, a laptop, a digital streaming device, a set-top box, a streaming stick, a television, and/or the like. In some scenarios, a user may have multiple user devices, such as a mobile phone, a smart watch, smart glasses, a combination thereof, and/or the like. The user device 106 may be configured to communicate with the gateway device 104, the server device(s) 102, the one or more premises devices 110, the one or more camera devices 112, and/or the like.

The user device 106 may be configured to output a user interface on a display of the user device 106. The display may comprise a television, screen, monitor, projector, and/or the like. The user interface may be output via the user interface via an application, service, and/or the like, such as a content browser. The user interface may receive application data from one or more of the server device(s) 102. The application data may be processed by the user device 106 to cause display of the user interface.

The user interface may comprise a premises management application 113. The premises management application 113 may be configured to output status information associated with the premises. The status information associated with the premises may comprise at least one of status information associated with the one or more premises device 110 or status information associated with the gateway device 104. The premises management application 113 may be configured to output camera data generated by the one or more camera devices 112. For example, a live video or audio stream, video or audio clips, and/or images captured by any or all of the camera devices 112 may be output by the premises management application 113 so that a user of the user device 106 can monitor the premises 116. The premises management application 113 may be configured to allow control of and/or sending commands to the premises 116 (e.g., to the one or more premises devices 110, the one or more camera devices 112, and/or the gateway device 104). The premises management application 113 may be configured to allow a user to configure settings associated with the one or more premises device 110, the one or more camera devices 112, the gateway device 104, and/or the like.

The premises management application 113 may comprise a plurality of pages. Each of the plurality of pages may display different information associated with the premises 116 and/or the premises management system 108, Each of the plurality of pages may comprise different user interface elements. The plurality of pages may comprise a default page that is loaded if the premises management application 113 is opened on the user device 106 (e.g., a default page that is loaded as part of executing or loading the premises management application 112), at least one page associated with a list of the one or more premises devices 110, at least one page associated with status information for the one or more premises devices 110, at least one page that is configured to render video, audio, and/or images from the one or more camera devices 112, at least one page that is not configured to render video, audio, and/or images from the one or more camera devices 112, and/or any other page.

The premises management application 113 and/or the user device 106 may be configured to determine a first event. The first event may be associated with loading a first page in the premises management application 113. For example, the first event may be associated with a user launching the premises management application 113 on the user device 106. The first page may comprise at least one of a default page that is loaded if the premises management application 113 is opened on the user device 106, a page associated with a list of the one or more premises devices 110, or a page associated with status information for the one or more premises devices 110. The first page may be a page that is not configured to render camera data from the one or more camera devices 112. The first event may be associated with an alert (e.g., notification) being sent to the premises management application 113 and/or the user device 106. The alert may be associated with a security event that has occurred at the premises 116. The alert may prompt or instruct the user to open the premises management application 113 on the user device 106.

The first event may comprise a user associated with the user device 106 opening the premises management application 113 on the user device 106. If the user opens the premises management application 113 on the user device 106, the first page may be displayed on the user interface. To open the premises management application 113 on the user device 106, the user may cause the premises management application 113 to run in a foreground of the user device 106. To cause the premises management application 113 to run in a foreground of the user device 106, the user may select one or more user interface elements that correspond to the premises management application 113. Before the user opened the premises management application 113 on the user device 106, the premises management application 113 may not have been executing on the user device 106. Alternatively, the premises management application 113 may have been executing in a background state of the user device 106 before the user opened the premises management application 113 on the user device 106.

If the user opens the premises management application 113 on the user device 106, this may indicate that the user is likely to engage with the premises management application 113 to manage or monitor the premises 116. For example, if the user opens the premises management application 113 on the user device 106, this may indicate that the user is likely to navigate from the first page (e.g., a page that is not configured to render camera data from the one or more camera devices 112) to a second page of the premises management application 113 in order to view camera data generated by the one or more camera devices 112. The second page of the premises management application 113 may be associated with rendering camera data from the one or more camera devices 112. For example, the second page of the premises management application 113 may be configured to render a live video stream of the one or more camera devices 112 and/or video clips captured by the one or more camera devices 112. The second page of the premises management application 113 may comprise one or more of a list of video clips for the one or more camera devices 112, a link to view a live video stream of the one or more camera devices 112, thumbnails associated with each of the one or more camera devices 112, or a combination thereof.

The premises management application 113 and/or the user device 106 may be configured to cause a connection to be established between the premises management application 113 and the one or more cameras 112. For example, the premises management application 113 and/or the user device 106 may be configured to cause a connection to be established between the premises management application 113 and the one or more cameras 112 based on determining the first event. The connection may immediately be established based on determining the first event.

The connection may comprise a video channel, a data channel, a combination thereof (e.g., combined as one channel, or via two separate channels). The video channel (e.g., or a streaming channel, a media channel, an audio channel, a combined video and audio channel) may be configured to exchange audio, video, and/or image data between the premises management application 113 and the one or more cameras 112. Additionally, or alternatively, the connection may comprise an audio channel that is separate from the video channel. The video channel may be utilized to send camera data generated by the one or more cameras 112 to the premises management application 113 and/or the user device 106 or display on the second page of the premises management application 113. The video channel may be unidirectional or bidirectional (e.g., both the premises management application 113 and the one or more cameras 112 can send and receive audio and/or video data in the same video channel). The data channel may be configured to exchange any type of data, including data that is not audio data, video data, or image data between the premises management application 113 and the one or more cameras 112. The data channel may be unidirectional or bidirectional (e.g., both the premises management application 113 and the one or more cameras 112 can send and receive data in the same data channel). The connection may comprise, for example, a peer-to-peer connection, such as a Web Real-Time Communication (WebRTC) connection.

If the user navigates to the second page, camera data generated by the one or more cameras 112 may be sent via the video channel to the premises management application 113 and/or the user device 106 so that the second page can render a live video stream of the one or more camera devices 112 and/or video clips captured by the one or more camera devices 112. If the connection is established before the user navigates to the second page, the user may not yet be able to view a live video stream of the one or more camera devices 112 and/or video clips captured by the one or more camera devices 112. Thus, the sending of data (e.g., video frames) via the video channel of the connection may be paused.

The premises management application 113 and/or the user device 106 may be configured to determine whether at least one pausing condition is satisfied. For example, the premises management application 113 and/or the user device 106 may be configured to determine whether at least one pausing condition is satisfied based on determining that the connection has been established. Determining whether the at least one pausing condition is satisfied may comprise determining whether the user has navigated to the second page after the first event. The at least one pausing condition may be satisfied if a determination is made that the user has not navigated to the second page after the first event. If a determination is made that the at least one pausing condition is satisfied, the sending of data via the video channel of the connection may be paused. If the sending of data via the video channel is paused, the one or more camera devices 112 may continue to capture video frames but not send the video frames to the premises management application 113 and/or the user device 106.

Conversely, the at least one pausing condition may not be satisfied if a determination is made that the user has navigated to the second page after the first event and/or is currently viewing the second page. If a determination is made that the at least one pausing condition is not satisfied, the sending of data via the video channel of the connection may not be paused. If the sending of data via the video channel is not paused, the one or more camera devices 112 may continue to capture video frames and send the video frames to the premises management application 113 and/or the user device 106. For example, video, audio, and/or image data generated by the one or more camera devices 112 may be sent from the one or more camera devices 112 to the premises management application 113 and/or the user device 106 for display, such as real-time display, on the second page.

The premises management application 113 and/or the user device 106 may be configured to send a first command to the one or more cameras 112. The first command may be a command to pause (e.g., stop, discontinue) the sending of data via the video channel of the connection. The first command may be sent via the data channel of the connection. The premises management application 113 may send the first command to the one or more cameras 112 based on determining that the at least one pausing condition is satisfied. The one or more cameras 112 may be configured to receive the first command. Based on receiving the first command, the one or more cameras 112 may not send captured camera data, such as video frames, to the premises management application 113 and/or the user device 106. For example, the one or more cameras 112 may be configured to capture video frames but not send the video frames to the premises management application 113 and/or the user device 106 while the sending of data via the video channel is paused. The captured video frames that are not sent to the premises management application 113 and/or the user device 106 may be discarded, stored in a buffer, stored for later viewing, or a combination thereof. Pausing the sending of video frames to the premises management application 113 and/or the user device 106 may minimize the amount of bandwidth needed to maintain the connection. The connection (e.g., the video channel of the connection) may continue to exist even though the connection is paused.

The premises management application 113 and/or the user device 106 may be configured to determine whether at least one un-pausing condition is satisfied. For example, the premises management application 113 and/or the user device 106 may be configured to determine whether at least one un-pausing condition is satisfied after determining that the connection has been paused. Determining whether the at least one un-pausing condition is satisfied may comprise determining whether a second event has occurred. The second event may be associated with loading the second page in the premises management application 113. For example, the second event may comprise the user navigating to the second page after the first event. The second event may comprise a sequence, pattern, or output of a machine learning model. The at least one un-pausing condition may be satisfied if a determination is made that the second event has occurred. If a determination is made that the at least one un-pausing condition is satisfied, the sending of data via the video channel of the connection may be resumed. If the sending of data via the video channel is resumed, the one or more camera devices 112 may resume sending captured video frames to the premises management application 113 and/or the user device 106.

Conversely, the at least one un-pausing condition may not be satisfied if a determination is made that the second event has not occurred. If a determination is made that the at least one un-pausing condition is not satisfied, the sending of data via the video channel of the connection may remain paused. If the sending of data via the video channel remains paused, the one or more camera devices 112 may continue to capture video frames but not send the video frames to the premises management application 113 and/or the user device 106.

The premises management application 113 and/or the user device 106 may be configured to send a second command to the one or more cameras 112. The second command may be a command to resume the sending of data via the video channel of the connection. The second command may be sent via the data channel of the connection. The premises management application 113 and/or the user device 106 may send the second command to the one or more cameras 112 based on determining that the at least one un-pausing condition is satisfied (e.g., based on determining the second event). The one or more cameras 112 may be configured to receive the second command. Based on receiving the second command, the one or more cameras 112 may resume and/or begin sending captured camera data, such as video frames, to the premises management application 113 and/or the user device 106.

The premises management application 113 and/or the user device 106 may be configured to receive captured camera data, such as video frames, from the one or more cameras 112. For example, the premises management application 113 and/or the user device 106 may be configured to receive captured camera data, such as video frames, from the one or more cameras 112 based on the second command. The premises management application 113 and/or the user device 106 may be configured to cause display (e.g., output) of the received camera data via the second page in the premises management application 113. For example, the premises management application 113 and/or the user device 106 may cause a live (e.g., real time) video or audio stream, video or audio clips, and/or images captured by any or all of the camera devices 112 to be output via the second page so that a user of the user device 106 can monitor the premises 116. Because the connection between the premises management application 113 and the one or more cameras 112 was already established prior to determining the second event, the premises management system 113 may be able to display the video frames captured by the camera devices 112 almost immediately (e.g., in less than a second) after determining the second event.

The premises management application 113 and/or the user device 106 may be configured to determine whether at least one re-pausing condition is satisfied. For example, the premises management application 113 and/or the user device 106 may be configured to determine whether at least one re-pausing condition is satisfied after the sending of data via the video channel has been resumed. Determining whether the at least one re-pausing condition is satisfied may comprise determining whether a re-pausing event has occurred. The re-pausing event may be associated with loading a page in the premises management application 113 that is different from the second page. For example, the second event may comprise the user navigating away from the second page after the second event. The at least one re-pausing condition may be satisfied if a determination is made that the re-pausing event has occurred. If a determination is made that the at least one re-pausing condition is satisfied, the sending of data via the video channel of the connection may be paused again. If the sending of data via the video channel is paused again, the one or more camera devices 112 may continue to capture video frames but not send the video frames to the premises management application 113 and/or the user device 106. Pausing the sending of video frames to the premises management application 113 and/or the user device 106 may minimize the amount of bandwidth needed to maintain the connection.

Conversely, the at least one re-pausing condition may not be satisfied if a determination is made that the re-pausing event has not occurred. If a determination is made that the at least one re-pausing condition is not satisfied, the sending of data via the video channel of the connection may not be re-paused. If the sending of data via the video channel is not re-paused, the one or more camera devices 112 may continue to capture video frames and send the video frames to the premises management application 113 and/or the user device 106. For example, video, audio, and/or image data generated by the one or more camera devices 112 may be sent from the one or more camera devices 112 to the premises management application 113 and/or the user device 106 for display, such as real-time display, on the second page.

The premises management application 113 and/or the user device 106 may be configured to send a re-pausing command to the one or more cameras 112. The re-pausing command may be a command to re-pause the sending of data via the video channel of the connection. The re-pausing command may be sent via the data channel of the connection. The premises management application 113 and/or the user device 106 may send the re-pausing command to the one or more cameras 112 based on determining that the at least one re-pausing condition is satisfied. The one or more cameras 112 may be configured to receive the re-pausing command. Based on receiving the re-pausing command, the one or more cameras 112 may stop sending captured camera data, such as video frames, to the premises management application 113 and/or the user device 106. For example, the one or more cameras 112 may be configured to capture video frames but not send the video frames to the premises management application 113 and/or the user device 106 while the sending of data via the video channel is re-paused. Re-pausing the sending of video frames to the premises management application 113 and/or the user device 106 may minimize the amount of bandwidth needed to maintain the connection.

If the user later navigates back to the second page, the premises management application 113 and/or the user device 106 may be configured to send a re-resume command to the one or more cameras 112. The re-resume command may be a command to once again resume the sending of data via the video channel of the connection. This re-pausing and re-resuming process may continue for the duration of the user interacting with the premises management application 113.

The premises management application 113 and/or the user device 106 may be configured to determine a third event. Occurrence of the third event may indicate that the user is done interacting with the premises management application 113. For example, determining the third event may comprise determining that the premises management application 113 is executing in a background state of the user device 106 and/or that the premises management application 113 is not executing on the user device 106. For example, the third event may comprise the user causing the premises manage-ment application 113 to execute in a background state of the user device 106. To cause the premises management appli-cation 113 to execute in a background state of the user device 106, the user may close the premises management application 113 on the user device 106 without terminating the premises management application 113, the user may turn off or lock the user device 106, or the user may open a different application on the user device 106. The third event may alternatively comprise the user causing termination of the premises management application 113 so that the prem-ises management application 113 is not executing in a foreground or background of the user device 106.

The premises management application 113 and/or the user device 106 may cause the connection between the premises management application 113 and the one or more cameras 112 to be terminated. For example, the premises manage-ment application 113 and/or the user device 106 may cause the connection between the premises management applica-tion 113 and the one or more cameras 112 to be terminated based on determining the third event.

The server device(s) 102 may be configured to provide one or more services, such as account services, application services, network services, content services, or a combina-tion thereof. The server device(s) 102 may comprise services for one or more applications installed on the user device 106, such as for the premises management application 113. The server device(s) 102 may generate application data associ-ated with the premises management application 113. The application data may comprise data for a user interface, data to update a user interface, data for an application session associated with the user device 106, and/or the like. The application data may comprise data associated with access, control, and/or management of the premises 116. The appli-cation data may comprise the premises data, camera data, updates to the premises data, updates to the camera data, and/or the like.

At least one of the server device(s) 102 may be configured to determine to send information (e.g., configuration set-tings, notifications, information about the premises) to the user device 106, the gateway device 104, the one or more premises device 110, the one or more camera devices 112, or a combination thereof. The server device(s) 102 may com-prise information (e.g., rules) associating various values, patterns, account information, and/or the like with corre-sponding information. The server(s) device 102 may detect a change in the premises data from the one or more premises devices 110. The server device(s) 102 may analyze the premises data and determine that an information rule is triggered. The information may be sent to the user device 106 based on the information rule being triggered and/or satisfied. The information may comprise at least a portion of the premises data, such as an image, video, sensor state (e.g., motion detected, window open, window closed, door open, door closed, temperature, measured particle level, smoke detected, heat detected) and/or the like. The information may comprise a configuration setting of the gateway device 104, the user device 106, the one or more premises devices 110, and/or the one or more cameras 112.

At least one of the server device(s) 102 may be configured to receive data indicating the first event at the user device 106. For example, the server device(s) 102 may receive the data indicating the first event at the user device 106 from the premises management application 113. As described above, the first event may be associated with loading the first page in the premises management application 113. The data indicating the first event may comprise data indicating that the application is executing in a foreground of the user device 106. At least one of the server(s) device 102 may be configured to cause the connection to be established between the premises management application 113 and the one or more cameras 112. For example, the server device 102 may be configured to cause the connection to be established between the premises management application 113 and the one or more cameras 112 based on receiving the data indicating the first event at the user device 106. Causing the connection to be established between the premises management application 113 and the one or more cameras 112 may comprise sending data for establishing a connection between the one or more cameras 112 and the user device 106. The data may be sent, for example, to one or more of the gateway device 104, the one or more cameras 112, or the user device 106.

At least one of the server device(s) 102 may be configured to receive data indicating the first command to pause the sending of data via the video channel. For example, the server device(s) 102 may receive the data indicating the first command from the premises management application 113. The first command may be a command sent from the premises management application 113 and/or the user device 106 to the one or more cameras 112 via the data channel of the connection. As described above, the first command may be a command to pause the sending of data via the video channel of the connection. At least one of the server device(s) 102 may be configured to cause the sending of data via the video channel to be paused. If the sending of data via the video channel is paused, the one or more cameras 112 may not send captured camera data, such as video frames, to the premises management application 113 and/or the user device 106.

At least one of the server device(s) 102 may be configured to receive data indicating the second event at the user device 106. For example, the server device(s) 102 may receive the data indicating the second event at the user device 106 from the premises management application 113. As described above, the second event may be associated with loading the second page in the premises management application 113. The second page may be associated with rendering video from the one or more cameras 112. The data indicating the second event may comprise data indicating that the user has navigated to the second page after the first event. At least one of the server device 102 may be configured to cause the sending of data via the video channel to be resumed. For example, the server device(s) 102 may be configured to cause the sending of data via the video channel to be resumed based on receiving the data indicating the second event. If the sending of data via the video channel is resumed, the one or more cameras 112 may send video frames to the premises management application 113 and/or the user device 106 via the video channel.

The gateway device 104 may be configured to facilitate communication between the one or more camera devices 112, and one or more of the server device(s) 102, the user device 106, the one or more premises devices 110, or a combination thereof. The gateway device 104 may perform processing of premises data, camera data, the first command, the second command, re-pausing commands, re-unpausing commands and/or the like.

The gateway device 104 may be comprise a computing device, an access point (e.g., wireless access point), a router, a modem, device controller (e.g., automation controller, security controller, premises health controller, content device controller) a combination thereof, and/or the like. The gateway device 104 may be configured to communicate using the one or more second networks 114 at the premises 116. The gateway device 104 may be configured to implement one or more services associated with the server device(s) 102 (e.g., or with the premises 116, a user account), such as a content service, a premises service, an automation service, a security service, a health monitoring service, or a combination thereof.

The gateway device 104 may be configured to receive a command from the server device(s) 102. The server device(s) 102 may send the command to the gateway device 104 based on at least one of the server device(s) 102 receiving the data indicating the first event at the user device 106. As described above, the first event may be associated with loading the first page in the premises management application 113. The data indicating the first event may comprise data indicating that the application is executing in a foreground of the user device 106.

The gateway device 104 may be configured to send data associated with establishing the connection. For example, the gateway device 104 may be configured to send data associated with establishing the connection based on receiving the command. The data associated with establishing the connection may be sent, for example, to one or more of the premises management application 113, the one or more cameras 112, or the server device(s) 102. The one or more cameras 112 may be configured to receive the data associated with establishing the connection between the premises management application 113 and the one or more cameras 112, such as from the gateway device 104. The one or more cameras 112 may be configured to cause the connection to be established between the premises management application 113 and the one or more cameras 112. For example, the one or more cameras 112 may be configured to cause the connection to be established based on the data associated with establishing the connection.

The gateway device 104 may be configured to receive data indicating the first command to pause the sending of data via the video channel. For example, gateway device 104 may be configured to receive data indicating the first command from the premises management application 113 and/or the user device 106. The gateway device 104 may be configured to send the command to the one or more cameras 112 to pause the sending of data via the video channel. For example, the gateway device 104 may be configured to send the command to the one or more cameras 112 to pause the sending of data via the video channel based on receiving the data indicating the first command to pause the sending of data via the video channel. The one or more cameras 112 may be configured to receive, via the data channel, the first command to pause the sending of data via the video channel. The one or more cameras 112 may be configured to cause the sending of data via the video channel to be paused. For example, the one or more cameras 112 may be configured to cause the sending of data via the video channel to be paused based on receiving the first command. If the sending of data via the video channel is paused, the one or more cameras 112 may not send captured camera data, such as video frames, to the premises management application 113 and/or the user device 106.

The gateway device 104 may be configured to receive data indicating the second command to resume the sending of data via the video channel. For example, gateway device 104 may be configured to receive data indicating the second command from the premises management application 113 and/or the user device 106. The second command may be a command sent from the premises management application 113 and/or the user device 106 to the one or more cameras 112 via the data channel of the connection.

The gateway device 104 may be configured to send a command to the one or more cameras 112 to resume the sending of data via the video channel. For example, the gateway device 104 may be configured to send the command to the one or more cameras 112 to resume the sending of data via the video channel based on receiving the data indicating the second command to resume the sending of data via the video channel. The one or more cameras 112 may be configured to receive the command to resume the sending of data via the video channel. The one or more cameras 112 may be configured to cause the sending of data via the video channel to be resumed. For example, the one or more cameras 112 may be configured to cause the sending of data via the video channel to be resumed based on receiving the command to resume the sending of data via the video channel. If the sending of data via the video channel is resumed, the one or more cameras 112 may send video frames to the premises management application 113 and/or the user device 106 via the video channel.

Figure 2:
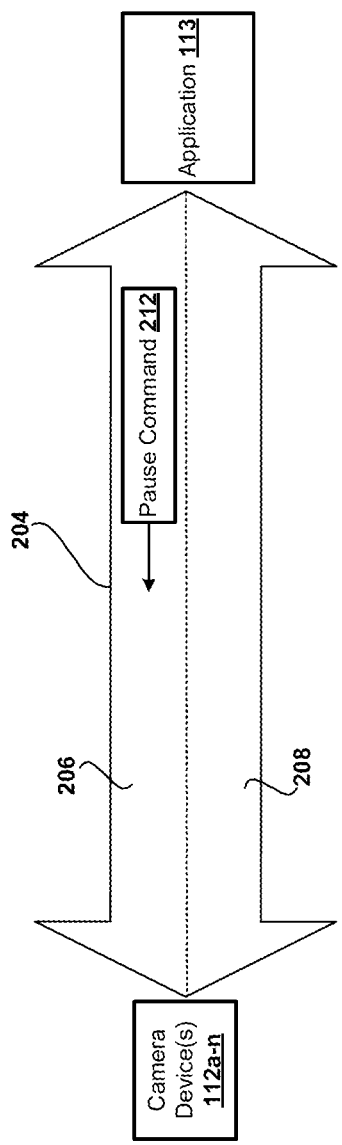
FIG. 2 shows an example communication process.

FIG. 2 shows a framework 200 for pausing the sending of data via a video channel. The framework 200 includes the premises management application 113 and the one or more cameras 112. A connection 204 may be established between the premises management application 113 and the one or more cameras 112. As described above, the connection 204 may have been established based on determining the first event associated with loading a first page in the premises management application 113. The connection 204 may comprise, for example, a peer-to-peer connection, such as a Web Real-Time Communication (WebRTC) connection. The connection may comprise a data channel 206 and a video channel 208. Additionally, or alternatively, the connection may comprise an audio channel that is separate from the video channel. The data channel 206 may be configured to exchange any type of data, including data that is not audio data, video data, or image data between the premises management application 113 and the one or more cameras 112. The video channel 208 may be configured to exchange audio, video, and/or image data between the premises management application 113 and the one or more cameras 112.

The premises management application 113 may send, via the data channel 206, a pause command 212 (e.g., the first command discussed above with regard to FIG. 1). The pause command 212 may be a command to pause the sending of data via the video channel 208. The pause command 212 may be sent via the data channel 206 to the one or more cameras 112. The premises management application 113 may send the pause command 212 to the one or more cameras 112 based on determining that at least one pausing condition is satisfied. The premises management application 113 may determine whether the at least one pausing condition is satisfied by determining whether the user has navigated to the second page of the premises management application 113 after the first event. The second page of the premises management application 113 may be associated with rendering camera data from the one or more camera devices 112. The at least one pausing condition may be satisfied if a determination is made that the user has not navigated to the second page after the first event. The one or more cameras 112 may receive the pause command 212. Based on receiving the pause command 212, the one or more cameras 112 may continue to capture camera data but not send the captured camera data to the premises management application 113 and/or the user device 106 via the video channel 208. For example, the one or more cameras 112 may be configured to capture video frames but not send the video frames to the premises management application 113 and/or the user device 106 while the sending of data via the video channel 208 is paused. Pausing the sending of video frames to the premises management application 113 and/or the user device 106 may minimize the amount of bandwidth needed to maintain the connection.

FIGS. 3A and 3B show a framework 300 for resuming (e.g., un-pausing) the sending of data via a video channel. The framework 300 includes the premises management application 113, the one or more cameras 112, and the connection 204. As described above, the premises management application 113 may be configured to determine whether at least one un-pausing condition is satisfied. For example, the premises management application 113 may be configured to determine whether at least one un-pausing condition is satisfied after the one or more cameras 112 have received the pause command 212. Determining whether the at least one un-pausing condition is satisfied may comprise determining whether a second event has occurred. The second event may be associated with loading the second page in the premises management application 113. For example, the second event may comprise the user navigating to the second page after the first event. The at least one un-pausing condition may be satisfied if a determination is made that the second event has occurred. If a determination is made that the at least one un-pausing condition is satisfied, the sending of data via the video channel 208 may be resumed.

To resume the sending of data via the video channel 208, the premises management application 113 may send a resume command 312 (e.g., the second command described above with regard to FIG. 1) to the one or more cameras 112. The second command may be sent via the data channel 206. The one or more cameras 112 may be configured to receive the resume command 312. Based on receiving the resume command 312, the one or more cameras 112 may resume and/or begin sending video data 314a to the premises management application 113 and/or the user device 106. The video data 314a may be sent via the video channel 208. The video data 314a may comprise camera data, such as video frames, captured by the one or more cameras 112.

The premises management application 113 may be configured to receive the video data 314a from the one or more cameras 112 via the video channel 208. The premises management application 113 may be configured to cause display (e.g., output) of the received video data 314a via the second page in the premises management application 113. For example, the premises management application 113 may cause a live (e.g., real time) video or audio stream, video or audio clips, and/or images captured by any or all of the camera devices 112 to be output via the second page so that a user of the user device 106 can monitor the premises 116. Because the connection 204 was already established prior to determining the second event, the premises management system 113 may be able to display the video frames captured by the camera devices 112 almost immediately (e.g., in less than a second) after determining the second event.

Figure 4:
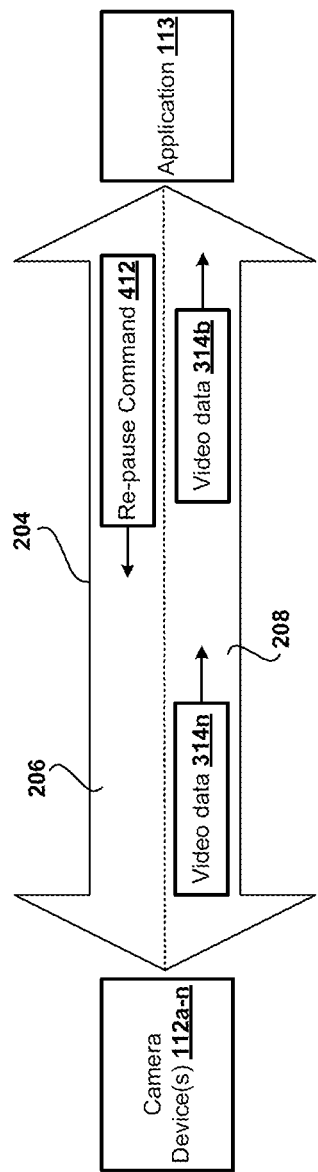
FIG. 4 shows an example communication process.

FIG. 4 shows a framework 400 for re-pausing the sending of data via a video channel. The framework 400 includes the premises management application 113, the one or more cameras 112, and the connection 204. As described above with regard to FIG. 3, the one or more cameras 112 may resume and/or begin sending video data 314a to the premises management application 113 and/or the user device 106 via the video channel 208 based on receiving the resume command 312. The one or more cameras 112 may continue to send video data 314b-n to the premises management application 113 and/or the user device 106. The premises management application 113 may continue to receive the video data 314*a-n*. As the premises management application 113 continues to receive the video data 314*b-n*, the premises management application 113 may continue to cause display (e.g., output) of the received video data 314*b-n* via the second page in the premises management application 113.

The one or more cameras 112 may continue to send video data 314*b-n* to the premises management application 113 and/or the user device 106 until at least one re-pausing condition is satisfied. The premises management application 113 may determine whether at least one re-pausing condition is satisfied. Determining whether the at least one re-pausing condition is satisfied may comprise determining whether a re-pausing event has occurred. The re-pausing event may be associated with loading a page in the premises management application 113 that is different from the second page. For example, the second event may comprise the user navigating away the second page after the second event. The at least one re-pausing condition may be satisfied if a determination is made that the re-pausing event has occurred. If a determination is made that the at least one re-pausing condition is satisfied, the sending of data via the video channel 208 of the connection 204 may be paused again.

To re-pause the sending of data via the video channel 208, the premises management application 113 may send a re-pause command 412 to the one or more cameras 112. The re-pause command 412 may be a command to re-pause the sending of data via the video channel 208. The re-pause command 412 may be sent via the data channel 206 of the connection 204. The one or more cameras 112 may receive the re-pause command 412. Based on receiving the re-pause command 412, the one or more cameras 112 may stop sending captured camera data to the premises management application 113 and/or the user device 106. For example, the one or more cameras 112 may be configured to capture video frames but not send the video frames to the premises management application 113 and/or the user device 106 while the sending of data via the video channel 208 is re-paused. Re-pausing the sending of video frames to the premises management application 113 and/or the user device 106 may minimize the amount of bandwidth needed to maintain the connection.

If the user later navigates back to the second page, the premises management application 113 may be configured to send a re-resume command to the one or more cameras 112. The re-resume command may be a command to once again resume the sending of data via the video channel 208 of the connection 204. This re-pausing and re-resuming process may continue for the duration of the user interacting with the premises management application 113. If the third event is determined, the premises management application 113 may cause the connection 204 between the premises management application 113 and the one or more cameras 112 to be terminated. As described above, determining the third event may comprise determining that the premises management application 113 is executing in a background state of the user device 106 and/or that the premises management application 113 is not executing on the user device 106.

Figure 5:
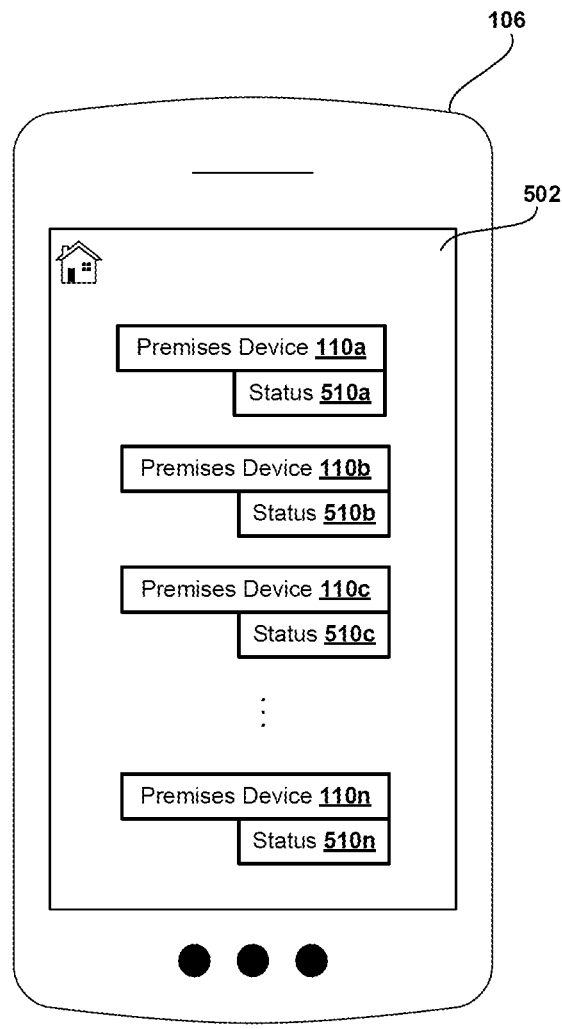
FIG. 5 shows an example user interface.

FIG. 5 shows an example user interface of the user device 106. The user interface depicts a page 502 of a premises management application (e.g., premises management application 113). The page 502 may be, for example, the first page described above with regard to FIGS. 1-4. The page 502 may not be configured to render video from the one or more cameras 112. The page 502 may be, for example, a default page that is loaded if the premises management application is opened.

The page 502 may display a list of the one or more premises device 110*a-n*. For example, the list of the one or more premises device 110*a-n* may indicate a name and/or type of each of the one or more premises device 110*a-n*. For example, the list of the one or more premises devices 110*a-n* may indicate, for each premises devices 110*a-n*, if that premises devices 110*a-n* is a sensor, a security system, a security controller, a gateway device, a smoke detector, a heat sensor, infrared sensor, infrared emitter, infrared camera, a door sensor, a motion sensor, a window sensor, a thermostat, a microphone, a personal assistant, a door lock, an irrigation device, or a combination thereof. The page 502 may display status information 510*a-n* for each of the one or more premises device 110*a-n*. For example, the status information 510*a-n* for a particular premises device 110*a-n* may indicate whether the premises device 110*a-n* is armed or disarmed, open or closed, unlocked or locked, on or off, online or offline, triggered or untriggered, low-battery, tampered, inactive or active, a mode of the premises device, and/or any other status information. The page 502 may allow a user to perform operations on the one or more premises device 110*a-n* (e.g., turning on a lamp, arming a security panel, etc.)

Figure 6:
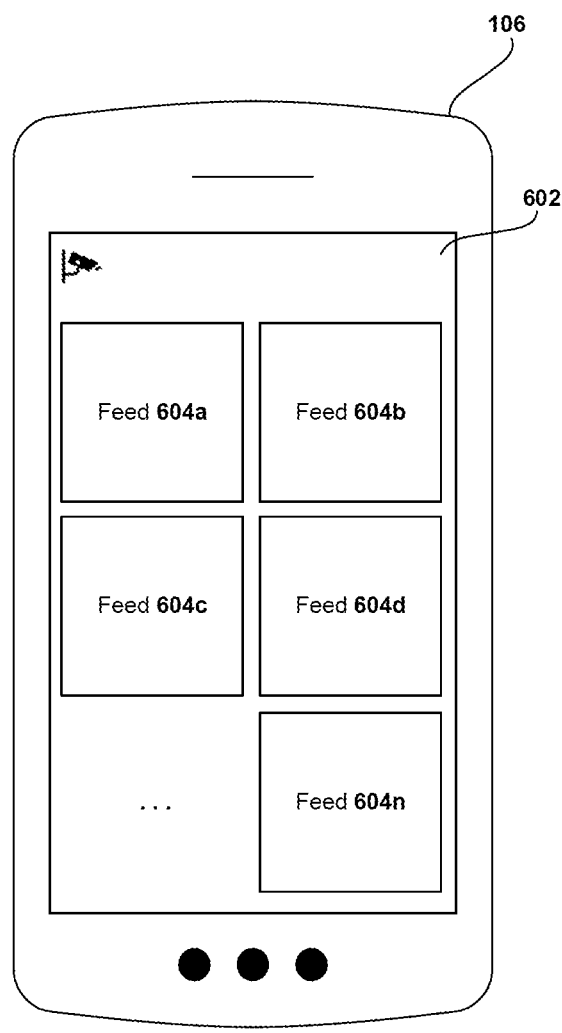
FIG. 6 shows an example user interface.

FIG. 6 shows an example user interface of the user device 106. The user interface depicts a page 602 of a premises management application (e.g., premises management application 113). The page 602 may be, for example, the second page described above with regard to FIGS. 1-4. The page 602 may be, for example, the second page described above with regard to FIGS. 1-4. The page 602 may comprise a render component (e.g., media player) and/or a link to a page with a render component. The render component maybe configured to render video from the one or more cameras 112. For example, the render component may be configured to receive media (e.g., video, audio, or a combination thereof) and output (e.g., display, play) the media. The page 502 discussed above with regard to FIG. 5 may not comprise the render component.

The page 602 may, for example, be configured to display at least one of a live video stream of each the one or more cameras 112 or video clips captured by each the one or more cameras 112 so that a user of the user device 106 can monitor the premises 116 via the page 602. Each of the one or more cameras 112 may be associated with a particular feed 604*a-n*. Each feed 604*a-n* may display at least one of a live video stream of the corresponding camera 112 or video clips captured by the corresponding camera 112. The user may select (e.g., click on) a particular feed 604*a-n* to view the live video stream of the corresponding camera 112 or the video clips captured by the corresponding camera 112 in more detail or in a larger window.

Figure 7:
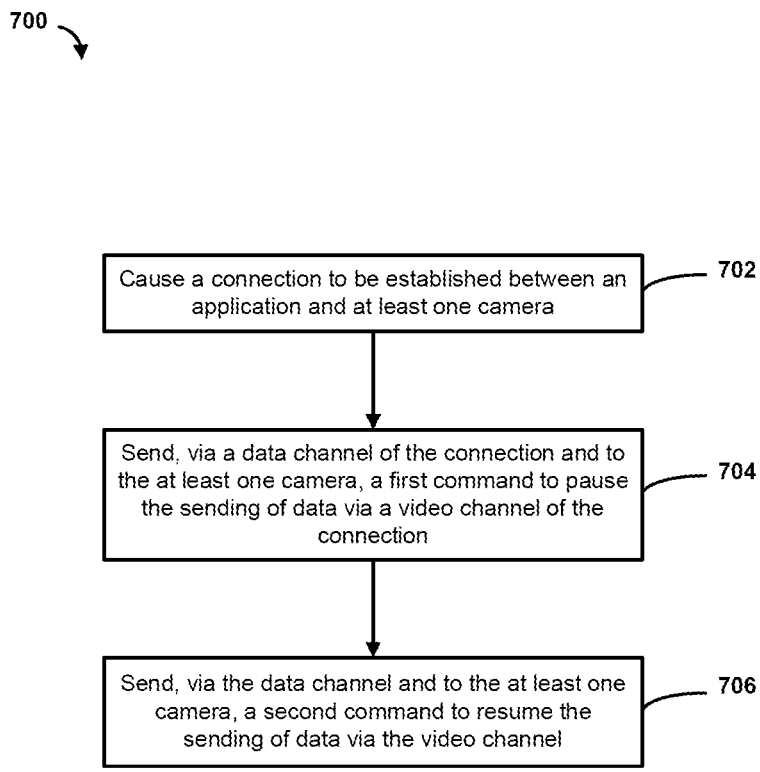
FIG. 7 shows a flowchart of an example method.

FIG. 7 is a flow diagram illustrating an example method. The method 700 may comprise a computer implemented method for connection management in a premises management system (e.g., premises management system 108). A system and/or computing environment, such as the system 100 of FIG. 1 and/or the computing environment of FIG. 10, may be configured to perform the method 700. For example, the premises management application 113 and/or the user device 106 of FIG. 1 may be configured to perform the method 700.

At step 702, a connection may be caused to be established. The connection may be between an application for controlling a premises management system and/or a user device and at least one camera. The at least one camera may be associated with the premises management system. The connection may comprise a video channel. The connection may comprise a data channel. The video channel may be configured to exchange audio, video, and/or image data between the application and/or the user device and the at least one camera. The data channel may be configured to exchange any type of data, including data that is not audio data, video data, or image data between the application and/or the user device and the at least one camera. The connection may comprise, for example, a peer-to-peer connection, such as a Web Real-Time Communication (WebRTC) connection.

The connection may be caused to be established based on a first event (e.g., based on and/or in response to determining the first event). The first event may be associated with a first page in the application. The first event may be associated with loading (e.g., or pre-loading, focusing on, etc.) the first page. The first page may comprise at least one of a default page that is loaded if the application is opened on a user device, a page associated with a list of one or more premises devices associated with the premises management system, or a page associated with status information for the one or more premises devices. Determining the first event may comprise determining that the application is executing in a foreground of the user device.

At 704, a first command may be sent. The first command may be sent to the at least one camera. The first command may be sent via the data channel of the connection. The first command may be a command to pause the sending of data via the video channel of the connection. The first command may be sent based on determining that at least one pausing condition is satisfied. The at least one camera may be configured to receive the first command. Based on receiving the first command, the at least one camera may not send data via the video channel of the connection. For example, the at least one camera may be configured to capture video frames but not send the video frames while the sending of data via the video channel is paused. Pausing the sending of video frames may minimize the amount of bandwidth needed to maintain the connection.

At 706, a second command may be sent. The second command may be sent to the at least one camera. The second command may be sent via the data channel of the connection. The second command may be a command to resume the sending of data via the video channel. The at least one camera may be configured to receive the second command. Based on receiving the second command, the at least one camera may resume and/or begin sending video frames via the video channel. The video frames may be received via the video channel. The received video frames may be displayed (e.g., output) via the second page in the application.

The second command may be sent based on a second event. The second event may be associated with a second page in the application. The second page of the application may be associated with rendering camera data from the at least one camera. For example, the second page of the application may be configured to render (e.g., display) a live video stream of the at least one camera and/or video clips captured by the at least one camera. The second page may comprise a render component (e.g., media player) and/or a link to a page with a render component. The render component may be configured to render video from the at least one camera. For example, the render component may be configured to receive media (e.g., video, audio, or a combination thereof) and output (e.g., display, play) the media.

A user may open a premises management application on a user device. A connection may be established between the premises management application and/or the user device while the user looks at a list of premises devices and/or looks at status information for the premises devices. The sending of video frames via the connection may be paused until the user navigates to a page in the premises management application that is configured to display camera data. If the user navigates to a page in the premises management application that is configured to display camera data, the sending of video frames via the connection may be resumed. Video frames may be sent from one or more cameras to the premises management application and/or the portable device for display on the page in the premises management application.

Figure 8:
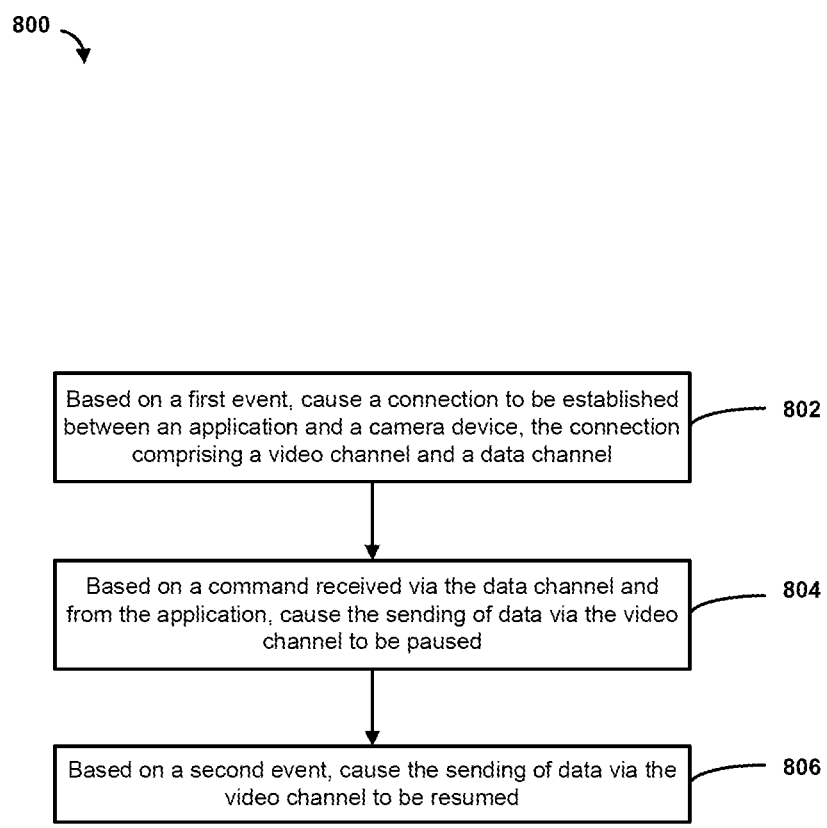
FIG. 8 shows a flowchart of an example method.

FIG. 8 is a flow diagram illustrating an example method. The method 800 may comprise a computer implemented method for connection management in a premises management system (e.g., premises management system 108). A system and/or computing environment, such as the system 100 of FIG. 1 and/or the computing environment of FIG. 10, may be configured to perform the method 800. For example, the one or more cameras 112 may be configured to perform the method 800.

At 804, the connection may be caused to be established. The connection may be between an application and/or a user device and a camera device. The application may be for controlling a premises management system located at a premises. The at least one camera may be associated with the premises management system. The connection may comprise a video channel and a data channel. The video channel may be configured to exchange audio, video, and/or image data between the application and/or the user device and the at least one camera. The data channel may be configured to exchange any type of data, including data that is not audio data, video data, or image data between the application and/or the user device and the at least one camera. The connection may comprise, for example, a peer-to-peer connection, such as a Web Real-Time Communication (WebRTC) connection.

The connection may be caused to be established based on a first event. The connection may be caused to be established based on receiving data indicating the first event. The first event may be associated with a first page in the application. The first page may comprise at least one of a default page that is loaded if the application is opened on a user device, a page associated with a list of one or more premises devices associated with the premises management system, or a page associated with status information for the one or more premises devices.

At 804, the sending of data via the video channel may be caused to be paused. For example, the sending of data via the video channel may be caused to be paused based on receiving the command. The at least one camera may be configured to capture video frames but not send the video frames while the sending of data via the video channel is paused. Pausing the sending of video frames may minimize the amount of bandwidth needed to maintain the connection. The sending of data via the video channel may be caused to be paused based on a command. The command may be a command to pause the sending of data via the video channel. The command may be received via the data channel of the connection. The command may be received from the application. The command may be sent from the application based on determining that at least one pausing condition is satisfied.

At 806, the sending of data via the video channel may be caused to be resumed. The video frames may be sent via the video channel to the application and/or the user device for display (e.g., output) via the second page in the application. The sending of data via the video channel may be caused to be resumed based on a second event. The sending of data via the video channel may be caused to be resumed based on receiving an indication of the second event. The indication may be received via the data channel. The indication may be received from the application. The second event may be associated with loading a second page in the application. The second page in the application may be associated with rendering video from the camera device. For example, the second page of the application may be configured to render (e.g., display) a live video stream of the camera device and/or video clips captured by the camera device.

A user may receive an alert on a user device. The alert may notify the user of a security event that has occurred at a premises. A connection may be established between the premises management application and/or the portable device if the user opens or reads the alert. The sending of video frames via the connection may be paused until the user navigates to a page in the premises management application that is configured to display camera data. If the user navigates to a page in the premises management application that is configured to display camera data, the sending of video frames via the connection may be resumed. Video frames may be sent from one or more cameras to the premises management application and/or the portable device for display on the page in the premises management application.

Figure 9:
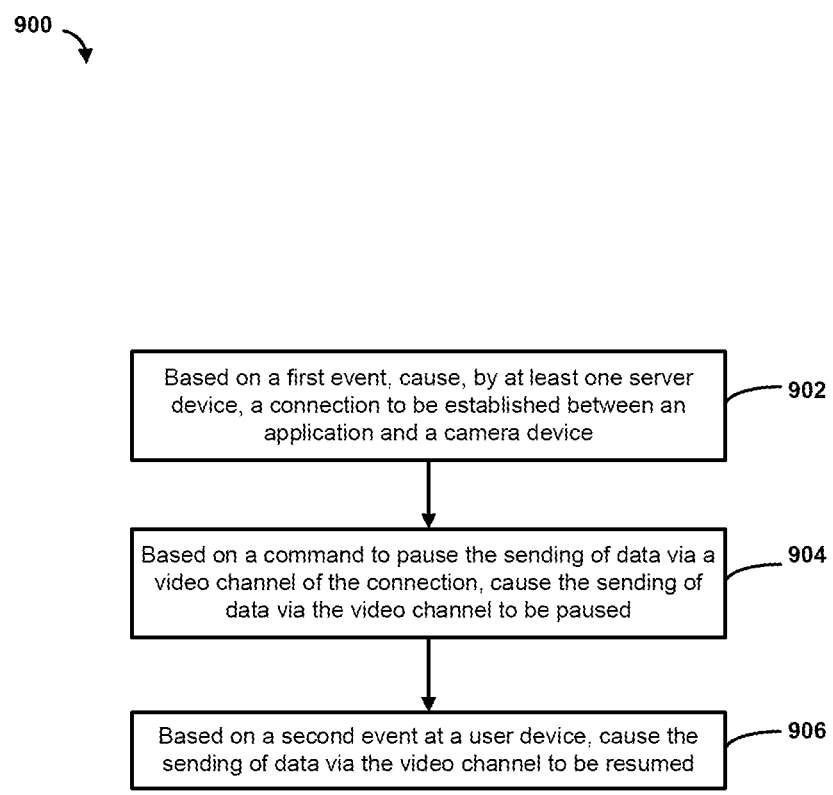
FIG. 9 shows a flowchart of an example method.

FIG. 9 is a flow diagram illustrating an example method. The method 900 may comprise a computer implemented method for connection management in a premises management system (e.g., premises management system 108). A system and/or computing environment, such as the system 100 of FIG. 1 and/or the computing environment of FIG. 10, may be configured to perform the method 900. For example, one or more of the server device(s) 102 of FIG. 1 may be configured to perform the method 900.

At 902, a connection may be caused to be established. The connection may be caused to be established by at least one server device. The connection may be between an application and a camera device. The application may be for controlling a premises management system located at a premises. The camera device may be associated with the premises management system. The connection may comprise a video channel and a data channel. The video channel may be configured to exchange audio, video, and/or image data between the application and/or the user device and the at least one camera. The data channel may be configured to exchange any type of data, including data that is not audio data, video data, or image data between the application and/or the user device and the at least one camera. The connection may comprise, for example, a peer-to-peer connection, such as a Web Real-Time Communication (WebRTC) connection.

The connection may be caused to be established based on a first event. The first event may be at a user device. The connection may be caused to be established based on receiving data indicating the first event. The data indicating the first event may be received (e.g., by at least one of the server device(s)). The first event may be associated with a first page in an application installed on the user device. The first page may comprise at least one of a default page that is loaded if the application is opened on the user device, a page associated with a list of one or more premises devices associated with the premises management system, or a page associated with status information for the one or more premises devices. The data indicating the first event may comprise data indicating that the application is executing in a foreground of the user device.

At 904, the sending of data via the video channel may be caused to be paused. If the sending of data via the video channel is caused to be paused, the at least one camera may not send data via the video channel of the connection. For example, the at least one camera may be configured to capture video frames but not send the video frames while the sending of data via the video channel is paused. Pausing the sending of video frames may minimize the amount of bandwidth needed to maintain the connection. The sending of data via the video channel may be caused to be paused based on a command. The sending of data via the video channel may be caused to be paused based on receiving data indicating the command. The command may be a command to pause the sending of data via the video channel. The command may be sent to the at least one camera from the application. The first command may be sent to the at least one camera from the application via the data channel of the connection.

At 906, the sending of data via the video channel may be caused to be resumed. For example, the one or more cameras may send video frames to the premises management application and/or the user device via the video channel. The sending of data via the video channel may be caused to be resumed based on a second event. The sending of data via the video channel may be caused to be resumed based on receiving data indicating the second event. The second event may be associated with a second page in the application. The second page may be associated with rendering video from the at least one camera. The data indicating the second event may comprise data indicating that the user has navigated to the second page after the first event.

A premises management application may be executing in the background of a user device. A user may open the premises management application on the user device so that the premises management application is running in a foreground of the user device. A connection may be established between the premises management application and/or the user device if it is determined that the premises management application is running in a foreground of the user device. The sending of video frames via the connection may be paused until the user navigates to a page in the premises management application that is configured to display camera data. If the user navigates to a page in the premises management application that is configured to display camera data, the sending of video frames via the connection may be resumed. Video frames may be sent from one or more cameras to the premises management application and/or the user device for display on the page in the premises management application. The sending of video frames via the connection may be re-paused if it is determined that the premises management application is executing in the background of the user device again.

Figure 10:
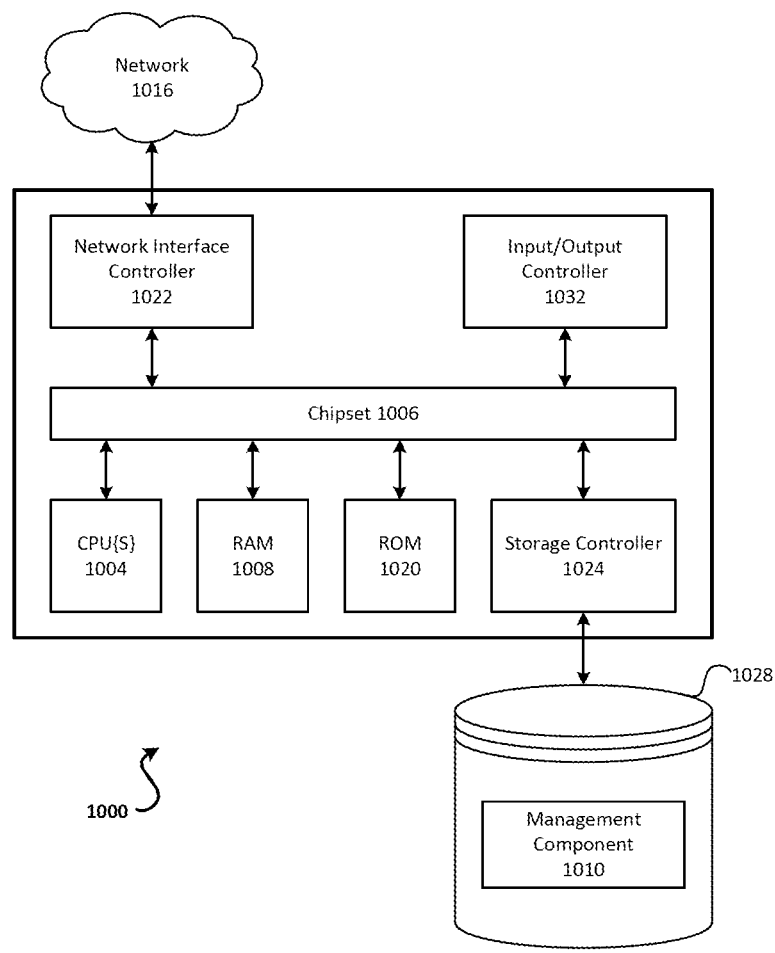
FIG. 10 is a block diagram illustrating an example computing device.

FIG. 10 depicts a computing device that may be used in various aspects, such as the servers and/or devices depicted in FIG. 1. With regard to the example architecture of FIG. 1, the server device 102, gateway device 104, user device 106, the one or more premises devices 110, and/or the one or more camera devices 112 may each be implemented in an instance of a computing device 1000 of FIG. 10.

The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 7, FIG. 8, and FIG. 9.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored.

The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described in relation to FIG. 7, FIG. 8, and FIG. 9.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, or in addition, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
   based on a first event associated with a first page in an application for controlling a premises management system, causing a connection to be established between the application and at least one camera associated with the premises management system, wherein the connection comprises a video channel and a data channel;
   sending, via the data channel and to the at least one camera, a command to pause sending of video data via the video channel;
   based on a second event associated with a second page in the application, sending, to the at least one camera via the data channel, a command to resume the sending of video data via the video channel, wherein the second page is associated with displaying video from the at least one camera;
   receiving, by the application, from the at least one camera, and based on the command to resume the sending of video data, at least one video frame; and
   causing, via the second page in the application, display of the at least one video frame.

2. The method of claim 1, wherein the first event associated with the first page in the application comprises an indication that the application is running in a foreground of at least one user device.

3. The method of claim 1, wherein the first page in the application comprises at least one of:
   a default page that is loaded if the application is opened;
   a page associated with a list of devices associated with the premises management system;
   a page associated with status information for the devices associated with the premises management system; or
   a page that is not configured to display video from the at least one camera.

4. The method of claim 1, wherein the at least one camera is configured to capture video frames but not send the video frames while the sending of video data via the video channel is paused.

5. The method of claim 1, wherein the second page is configured to display at least one of a live video stream of the at least one camera or video clips captured by the at least one camera.

6. The method of claim 1, further comprising based on a third event associated with the application, causing the connection between the application and at least one camera to be terminated, wherein the third event comprises one or more of an indication that the application is executing in a background state of at least one user device or an indication that the application is not executing on the at least one device.

7. The method of claim 1, further comprising determining that at least one pausing condition is satisfied, wherein sending the command to pause the sending of video data via the video channel is based on determining that the at least one pausing condition is satisfied.

8. A method comprising:
   based on a first event associated with a first page in an application for controlling a premises management system, causing a connection to be established between the application and a camera device, wherein the connection comprises a video channel and a data channel;
   based on a command received via the data channel and from the application, causing sending of video data via the video channel to be paused; and
   based on a second event, causing the sending of video data via the video channel to be resumed, wherein the video data comprises at least one video frame, wherein the second event is associated with a second page in the application, and wherein the second page is associated with displaying video from the camera device;
   wherein the application is configured to receive, from the camera device, and based on causing the sending of the video data via the video channel to be resumed, the at least one video frame and cause display of the at least one video frame via the second page in the application.

9. The method of claim 8, wherein the first event associated with the first page in the application comprises determining, by at least one user device, that the application is executing in a foreground of at least one user device.

10. The method of claim 8, wherein the first page in the application comprises at least one of:
    a default page that is loaded if the application is opened;
    a page associated with a list of devices associated with the premises management system;
    a page associated with status information for the devices associated with the premises management system; or a page that is not configured to display video from the camera device.

11. The method of claim 8, wherein the camera device is configured to capture video frames but not send the video frames while the sending of video data via the video channel is paused.

12. The method of claim 8, wherein the second page is configured to display at least one of a live video stream of the camera device or video clips captured by the camera device.

13. The method of claim 8, further comprising based on a third event associated with the application, causing the connection between the application and camera device to be terminated, wherein the third event comprises one or more of an indication that the application is executing in a background state of at least one user device or an indication that the application is not executing on the at least one device.

14. The method of claim 8, further comprising sending, to the application, at least one video frame for display via the second page in the application.

15. A method comprising:
 based on a first event associated with a first page in an application for controlling a premises management system, causing, by at least one server device, a connection to be established between the application and a camera device, wherein the connection comprises a video channel and a data channel;
 based on a command to pause sending of video data via the video channel, causing the sending of video data via the video channel to be paused; and
 based on a second event at a user device, causing the sending of video data via the video channel to be resumed, wherein the video data comprises at least one video frame, and wherein the second event is associated with a second page in the application, the second page associated with displaying video from the camera device;
 wherein the application is configured to receive, from the camera device, based on causing the sending of the video data via the video channel to be resumed, the at least one video frame and cause display of the at least one video frame via the second page in the application.

16. The method of claim 15, wherein the first event comprises an indication that the application is executing in a foreground of the user device.

17. The method of claim 15, wherein the first page in the application comprises at least one of:
 a default page that is loaded if the application is opened;
 a page associated with a list of devices associated with the premises management system;
 a page associated with status information for the devices associated with the premises management system; or
 a page that is not configured to display video from the camera device.

18. The method of claim 15, wherein the camera device is configured to capture video frames but not send the video frames to the application while the sending of video data via the video channel is paused.

19. The method of claim 15, further comprising based on the at least one server device receiving data indicating a third event, causing the connection between the application and camera device to be terminated, wherein the third event comprises one or more of an indication that the application is executing in a background state of the user device or an indication that the application is not executing on the user device.

* * * * *